United States Patent [19]

Federn

[11] Patent Number: 4,737,136

[45] Date of Patent: Apr. 12, 1988

[54] TORSIONALLY RIGID, ELASTICALLY FLEXIBLE SHAFT COUPLING

[76] Inventor: Klaus Federn, Dachsberg 14, D-1000 Berlin 33, Fed. Rep. of Germany

[21] Appl. No.: 834,339

[22] PCT Filed: May 13, 1985

[86] PCT No.: PCT/DE85/00163

§ 371 Date: Feb. 26, 1986

§ 102(e) Date: Feb. 26, 1986

[87] PCT Pub. No.: WO85/05420

PCT Pub. Date: Dec. 5, 1985

[30] Foreign Application Priority Data

May 14, 1984 [DE] Fed. Rep. of Germany ............. 3417774412

[51] Int. Cl.$^4$ ............................................. F16D 3/79
[52] U.S. Cl. ..................................................... 464/99
[58] Field of Search ............................ 464/98, 99, 137

[56] References Cited

U.S. PATENT DOCUMENTS

| | | | |
|---|---|---|---|
| 2,588,668 | 3/1952 | Syrouy | 464/98 X |
| 3,677,031 | 7/1972 | Zierak et al. | 464/99 |
| 3,808,837 | 5/1974 | Anderson et al. | 464/99 |
| 4,523,916 | 6/1985 | Kizler et al. | 464/98 |

FOREIGN PATENT DOCUMENTS

| | | |
|---|---|---|
| 7435748 | 7/1976 | Fed. Rep. of Germany . |
| 2741652 | 3/1979 | Fed. Rep. of Germany . |
| 923141 | 4/1963 | United Kingdom . |
| 2091843 | 8/1982 | United Kingdom ............. 464/99 |

OTHER PUBLICATIONS

"Engineering Materials & Design", Band 22, Nr. 4, Apr. 1978, pp. 52-56, Design Evaluation of the Metastream Coupling.

*Primary Examiner*—Daniel P. Stodola
*Attorney, Agent, or Firm*—Ostrolenk, Faber, Gerb & Soffen

[57] ABSTRACT

In a torsionally rigid, elastically flexible shaft coupling at least two membranes are provided as transmission elements, which, on the inner and outer edge, have regularly spaced bores for clamping screws on the two coupling halves. In the intermediate area the membranes are provided with uniformly spaced openings. In order to increase the loading capacity of the shaft coupling, as well as to render possible the checking of the proper functioning of the membranes without dismantling them, the membranes are mutually offset by a fraction of the spacing of their openings. Moreover the fixing bores in a sector, which is equivalent to at the most half that of the openings, are arranged so that the bores for the clamping screws are aligned.

5 Claims, 3 Drawing Sheets

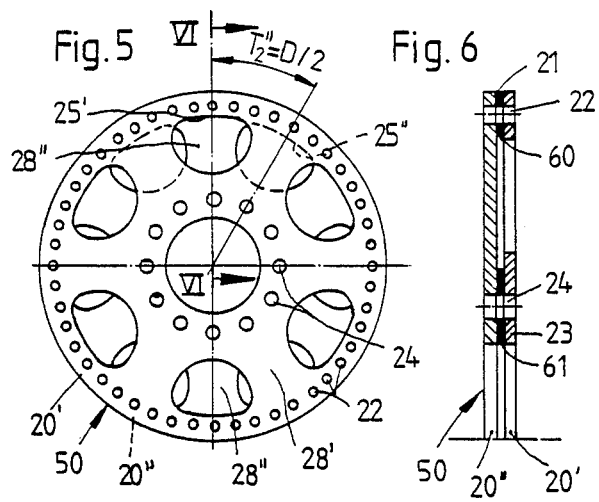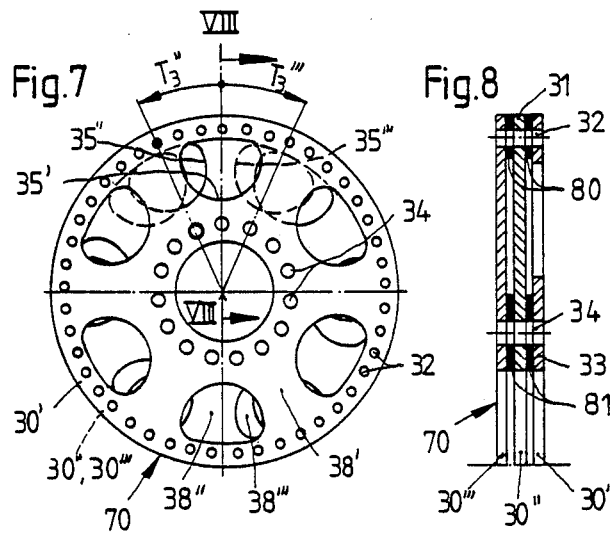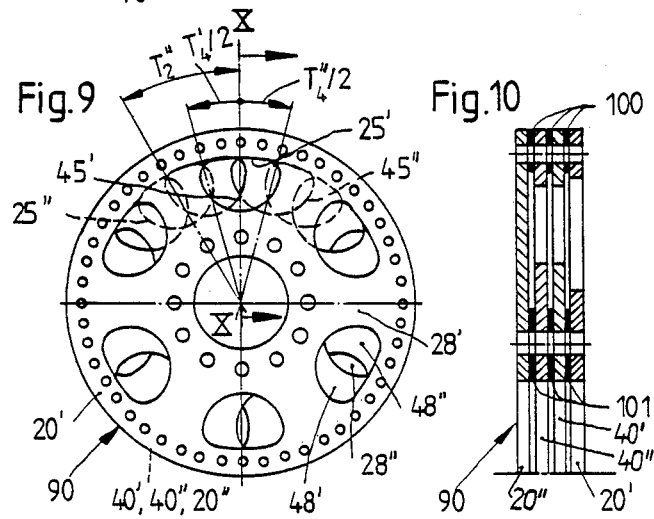

TORSIONALLY RIGID, ELASTICALLY FLEXIBLE SHAFT COUPLING

The invention relates to a torsionally rigid, elastically flexible shaft coupling.

For such a shaft coupling, known from German Gebrauchsmusterschrift No. 74 35 748, membranes are provided with asymmetrically formed openings so that the spokes formed between the openings are inclined radially. To the inner and outer root of each spoke is assigned one hole, respectively for clamping the membranes at the inner and outer edge to their two coupling halves by means of screws. There are no more fixing bores at the edge zones of the membranes other than said one hole per spoke. Therefore the membranes and spokes are forced into coincidence when stacked one on top of another. In such shaft couplings, the clamping screws of the membranes are strongly loaded, as the coinciding spokes of the stacked membranes, which are subject to bending stress, act on just one of the associated screws respectively. Thereby, the edge zones of the membranes extending between the clamping bores are not brought into action for torque transmission as no screw couplings are provided there.

As such shaft couplings are exposed to high alternating stresses, it is necessary to check their operability from time to time. In order to do so, the coupling must be dismantled, particularly in order to check the spokes of the membranes for cracks and deformation. This is especially expensive in time and cost.

The object of the invention is to increase the loading capacity of the shaft coupling. That type of coupling generally has at least two membranes as force transmission elements. The membranes are provided at their outer and inner edges with regularly spaced bores for clamping screws to interconnect the two coupling halves. The intermediate areas of the membranes are provided with uniformly spaced openings. This structure also makes possible the checking of the proper functioning of the membranes without dismantling them.

This object is attained by rotationally arranging the membranes so that they are offset with respect to each other by a fraction of the spacing of their openings. In addition, fixing bores are provided which are disposed with a spacing which is at most half of the said openings so that the bores for the clamping screws are aligned. This solution offers the advantage that the spokes of the membranes are at least partially visible through the openings in the membranes and they are accessible for inspection for deformation or cracks. On the basis of the mutually offset membranes, different clamping screws respectively on the two coupling halves are assigned to the spokes, so that the force of the torque to be transmitted by the coupling is distributed more uniformly over the inner and outer periphery of the coupling halves. The transmission of forces from the spokes of the membranes to the clamping screws on the outer and inner edge of the membranes is distributed to a greater number of screws in this way and thus more harmoniously.

The purpose of having the openings have at least the angular width of the spokes between two openings is that, when using two membranes in the shaft coupling, the full width of the respective spokes of one membrane are visible through the openings of the other membrane and the spokes are easily controllable. For this purpose, the peripheral direction of the openings of the membranes have at least the same clear width which corresponds to the width of a membrane spoke passing between two openings. The spoke here referred to is that portion of the membrane which extends between two adjacent openings. Indeed, it is known from DE Gebrauchsmusterschrift No. 74 35 748 that the spokes of one membrane shall coincide with the openings of the adjacent membrane. However, there is no indication that this measure is to be provided for the purpose of inspecting the membranes.

With the additional disposing of membranes axially, a sound test for the membranes is also envisaged, apart from a visual inspection. In this way, the appropriate exposed membrane spoke can be struck and the lack of damage or damage can be ascertained from the sound picture generated by the blow. A disc extending parallel to the membranes which provides protection against spinning is disposed between the membranes and the coupling half. This ensures uninhibited access to the membrane spokes from the side of the smaller coupling half. It protects the coupling from damage in the event the membranes fracture when spinning at high speed, by preventing the smaller coupling half from being thrown outward.

The refinement of shaping the openings with particular generally kidney shape and rounded sides, as detailed below, ensures that, in the case of shaft couplings having spokes tapering in width towards the outer edge of the membrane, are adjusted in respect to the stress prevalent in the membrane under operational load. Furthermore, by limiting the membrane spokes towards the inner and outer edge zone of the membrane in the form of rounded transitory areas, the notch effect is decreased.

BRIEF DESCRIPTION OF THE DRAWINGS

The invention and its objects are described in connection with the drawings in which three exemplified embodiments of the invention are explained in more detail below and in which:

FIG. 5 is a front view of a stratified package of two mutually offset membranes, as the first exemplified embodiment, FIG. 6 is a half-section through the membrane package along the line VI—VI in FIG. 5, on an increased scale, FIGS. 7 and 8 are a stratified package of three membranes, as a second exemplified embodiment, in a manner of representation corresponding to FIGS. 5 and 6, FIGS. 9 and 10 are a third exemplified embodiment, a stratified package of four membranes, likewise in a manner of representation corresponding to the preceding FIGS. 5 to 8.

DETAILED DESCRIPTION OF THE EMBODIMENTS

Figure 1:
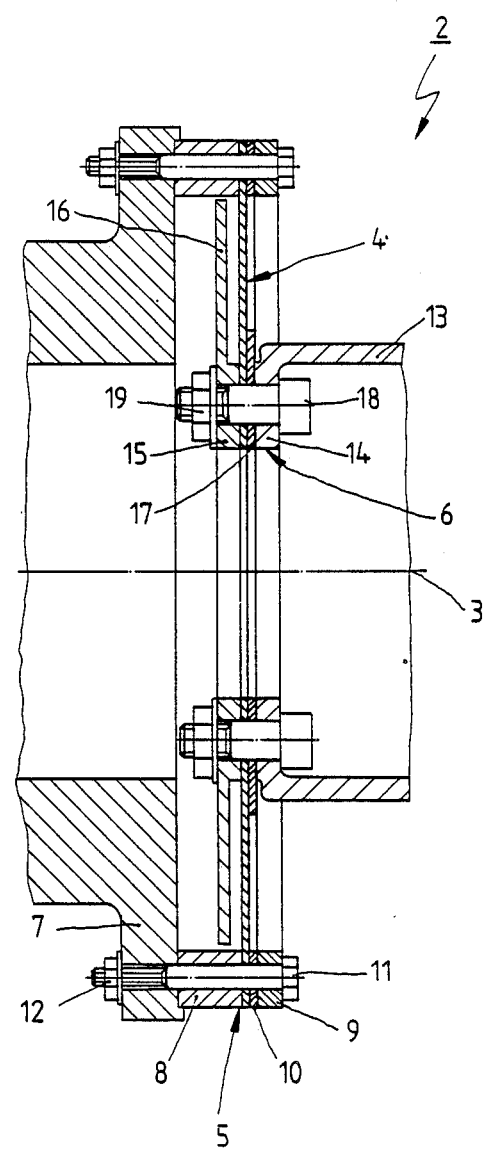
FIG. 1 is an axial section through a shaft coupling having a package of two membranes as transmission elements between the two coupling halves.

The torsionally rigid, elastically flexible shaft coupling 2 shown in FIG. 1 is provided with transmission elements, disposed perpendicular to its axis of rotation 3, in the form of a package of membranes 4, which connects the two coupling halves 5 and 6 to one another. The radially larger coupling half 5 bears a spacer ring 8 as well as a clamping ring 9 at the outer edge of its flange 7. With its outer edge 10, the membrane package 4 engages between the spacer ring 8 and the clamping ring 9. These components are penetrated by clamping screws 11 uniformly spaced along the periphery of the coupling half 5 and are clamped to the flange 7 by means of nuts 12.

The enclosed coupling half 6 has an intermediate sleeve 13 having a flange 14 which points inwards. To this flange 14 is assigned a clamping ring 15, the cross section of which extends radially as far as the proximity of the spacer ring 8 of the external coupling half 5. The disk 16 formed in this way extends parallel to the membranes 4 between these and the flange 7 of the coupling half 5 and provides protection against the smaller coupling half 6 being thrown outward in the event of the membrane breaking. The flange 14 of the intermediate sleeve 13, the inner edge 17 of the membrane package 4 and the clamping ring 15 are also held together by uniformly spaced clamping screws 18 and the associated nuts 19.

Figure 2:
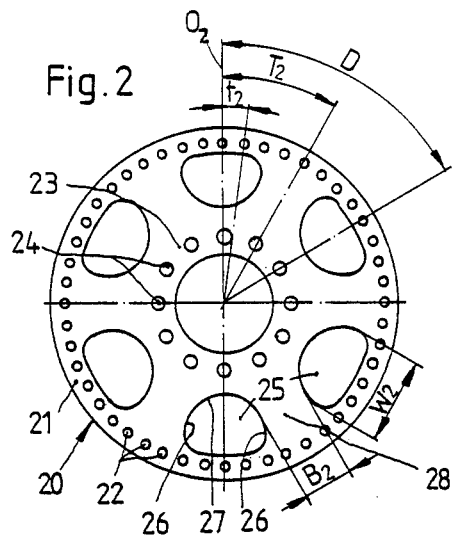
FIGS. 2 to 4 are front views of membranes which differ by irregularly spaced fastening bores at the inner and outer edge, on a smaller scale than in FIG. 1.

The membrane 20 shown in FIG. 2 has the shape of a circular ring. At its outer edge 21 it is provided with forty-eight bores 22 for the passage of the clamping screws 11. The bores 22 have a uniform spacing $t_2$ of 7° 30', starting from the ordinate $O_2$. At its inner edge 23 the membrane 20 has twelve bores 24 for the clamping screws 18 of coupling half 6. These bores 24 have a spacing $T_2$ of 30°, starting from ordinate $O_2$.

In the intermediate area, the membrane 20 is provided with six openings 25 with uniform spacing D of 60°. The openings 25 constructed symmetrically in relation to the radii are approximately kidney-shaped and, when radially extended towards the outer edge 21, are limited in parallel at a common distance from the outer edge 21. They are rounded at both sides 26, and then open into a curve 27 having a larger radius, directed towards the inner edge 23 of the membrane 20. A spoke 28, situated between two openings 25, therefore tapers from the inner edge 23 towards the outer edge 21 of the membrane 20. Its smallest width $B_2$ there is less than the clear width $W_2$ of the openings 25 measured in the peripheral direction.

Figure 3:
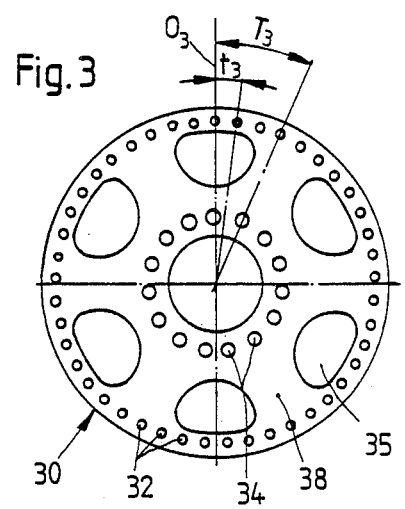

The membrane 30 shown in FIG. 3 differs from the design described above relating to FIG. 2 in that, starting from ordinate $O_3$, forty-five outer bores 32 with a spacing $t_3$ of 8° are provided, and fifteen inner bores 34 with a spacing $T_3$ of 24° are provided.

Figure 4:
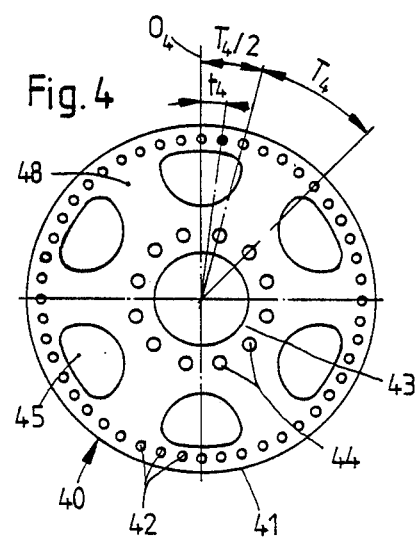

The membrane 40 shown in FIG. 4 has, on the other hand, forty-eight bores 42 at the outer edge 41 with a spacing $t_4$ of 7° 30', starting from ordinate $O_4$. At the inner edge 43 of membrane 40 are disposed twelve bores 44 with a spacing $T_4$ of 30° starting 15° from the ordinate $O_4$.

The first exemplified embodiment, shown in FIGS. 5 and 6, of a membrane package 50 for use in the shaft coupling described at the beginning (FIG. 1), consists of two membranes 20 in the design according to FIG. 2. The membrane 20' placed on top in FIG. 5 occupies the same position as that in FIG. 2, whereas the lower membrane 20" having the same shape is offset by a spacing $T_2''$. By this arrangement, both the outer bores 22 and also the inner bores 24 for the clamping screws 11 and 18, respectively, of shaft coupling 1 align. On the other hand, the openings 25' and 25" respectively of the two membranes 20' and 20" are mutually offset by half a spacing D so that the spokes 28" of the lower membrane 20" are visible through the openings 25' of the membrane 20' placed on top. By this, the intended visual inspection of the spokes is made possible even for the membrane which, in the case of the membrane package mounted in the shaft coupling 1, lies on the side of the disk 16 serving as protection as explained above. As the half-section displayed in FIG. 6 shows, the two membranes 20' and 20" of the membrane package 50 may be disposed with axial distance. For this purpose between the two membranes 20' and 20" are inserted spacer rings 60 and 61, which follow the outer edge 21 and the inner edge 23 of the two membranes and which are provided with openings for the clamping screws 11 and 18 of the shaft coupling 2 according to FIG. 1.

The second exemplified embodiment shown in FIGS. 7 and 8 of a membrane package 70 has three membranes 30 in the design according to FIG. 3. Starting with three congruent, superposed membranes 30, the top membrane 30' is in the same position as that in FIG. 3; on the other hand the membrane underneath 30" is offset in the anti-clockwise direction by the spacing $T_3''$, the lowest membrane 30''' is offset in relation to the membrane 30' by the spacing $T_3'''$ in the clockwise direction. Even with this arrangement the outer bores 32 and also the inner bores 34 of all the membranes align. The full width of the spokes 38" of the intermediate membrane 30" are visible through the openings 35' of the upper membrane 30' and the spokes 38''' of the lower membrane 30''' are partially visible through the openings 35" of intermediate membrane 30". However, the reduced visibility of the spokes 38''' of the bottom membrane 30''' is completely adequate for checking for cracks and for a sound test. Also for membrane package 70 spacer rings 80 and 81 are inserted between the individual membranes 30', 30" and 30''' at the outer edge 31 and at the inner edge 33 (FIG. 8).

The membrane package 90 shown in FIGS. 9 and 10 as the third exemplified embodiment is constructed from two membranes 20 in the form according to FIG. 2 as well as from two membranes 40 according to FIG. 4. At the top the membrane package 90 is formed by membrane 20', beneath that by two membranes 40' and also 40", and at the lowest point by a membrane 20". Taking as a basis the membranes, which are superposed in the position according to FIGS. 2 and 4 and the respective openings 25 and 45 of which are congruent, the membrane 40' beneath the top membrane 20' is staggered by half a spacing $T_4'$ in the anti-clockwise direction. The membrane 40" i placed in third position is staggered in relation to the top membrane 20' by half a spacing $T_4''$ in the clockwise direction. Finally, the lowest membrane 20" is staggered by a spacing $T_2''$ in relation to the top membrane 20'. The spokes 48' of the subjacent membrane 40' are thus visible inside the openings 25' of the top membrane 20'. Through the cross-section bordered by the openings 25' of the top membrane 20' and through the openings 45' of the membrane 40' in second position, the spokes 48" of the subjacent membrane 40" are partially visible. Lastly, the slightly overlapping openings 45' of the membrane 40' give an unobstructed view of the spokes 28" of the lowest membrane 20". Also in the third exemplified embodiment spacer rings 100 and 101 are inserted between the individual membranes 20', 40', 40" and 20" of the package 90 at the outer and inner edge.

I claim:

1. Torsionally rigid, elastically flexible shaft coupling having two coupling halves to be coupled and a coaxial membrane array comprising at least first, second and third coaxial membranes as transmission elements between the coupling halves;

the membranes each having an outer edge and an inner edge; and having a first plurality of regularly angularly spaced outer bores toward the outer edge and a second plurality of regularly angularly spaced inner bores toward the inner edge; all the inner bores being at the same radial location around the membranes, and all the outer bores being at the same radial location around the membranes;

the membranes being in relative angular positions such that respective inner and outer bores in the coaxial membranes are aligned, clamping means being received in the aligned bores toward the outer and inner edges;

each membrane having an intermediate area, with uniformly angularly spaced openings through the intermediate area; the membranes being mutually angularly offset by a fraction of the angular spacing of their respective spaced openings for providing access through the opening in each membrane to the area between openings of another membrane, and the bores being disposed with an angular spacing which is at most half the spacing of the openings so that around the membrane and between two adjacent openings on each membrane, there is both a respective outer bore for each of the membranes and a respective inner bore for each of the membranes which are aligned, the aligned bores receiving the clamping means;

wherein the part of a membrane between each two openings comprises a spoke; the outer bores and the inner bores on the membrane being placed and spaced so that, with the membranes angularly offset, the spokes of one of the membranes are at least partially behind and are visible through the openings in the coaxial membrane adjacent, while the inner and outer bores on the membranes are aligned for receiving respective clamping means; and wherein each membrane is angularly offset from the others to that the spokes of the first membrane, at one axial end of the array of membranes, are at least partially behind and visible through the openings of all the other membranes; and the spokes of the second membrane, between the first and third membranes of the axial array, are at least partially behind and visible through the openings in the third membrane at the other axial end of the array of membranes.

2. Shaft coupling according to claim 1, wherein in the angular direction, spokes of the membranes alternate with the spaced openings of the membranes, and each opening has at least the same clear width as the width of the membrane spoke passing between two of the openings.

3. Shaft coupling according to claim 2, wherein the membranes are axially spaced from each other.

4. Shaft coupling according to claim 3, wherein one of the coupling halves is radially larger than the other coupling half, and a disk coaxial with the membranes and extending parallel to the membranes extends radially outward from the smaller one of the coupling halves and toward the radially larger one of the coupling halves for limiting radial movement of said smaller coupling half.

5. Shaft coupling according to claim 2, wherein the spokes between the openings are mostly tapering in width towards the outer edge of the membrane; the openings each being symmetric in relation to a radius of the membrane angularly through the middle of the opening, and being rounded at both angular sides and opening into a curve having a larger radius than the rounding of the angular sides and directed towards the inner edge of the membrane.

* * * * *